(12) United States Patent
Forman et al.

(10) Patent No.: US 9,576,251 B2
(45) Date of Patent: Feb. 21, 2017

(54) METHOD AND SYSTEM FOR PROCESSING WEB ACTIVITY DATA

(75) Inventors: George Forman, Port Orchard, WA (US); Evan R. Kirshenbaum, Mountain View, CA (US); Shyam Sundar Rajaram, Mountain View, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1827 days.

(21) Appl. No.: 12/618,151

(22) Filed: Nov. 13, 2009

(65) Prior Publication Data

US 2011/0119267 A1  May 19, 2011

(51) Int. Cl.
G06F 17/30 (2006.01)
G06Q 10/00 (2012.01)
G06Q 30/00 (2012.01)

(52) U.S. Cl.
CPC ............. *G06Q 10/00* (2013.01); *G06Q 30/00* (2013.01)

(58) Field of Classification Search
USPC ............. 707/706, 3, 102, 607, 708, 10, 6, 2, 805,707/5, 736, 748, 760; 709/224
See application file for complete search history.

(56) References Cited

U.S. PATENT DOCUMENTS

| | | | |
|---|---|---|---|
| 6,529,901 B1 * | 3/2003 | Chaudhuri et al. | |
| 6,606,657 B1 * | 8/2003 | Zilberstein et al. | 709/224 |
| 6,763,338 B2 | 7/2004 | Kirshenbaum | |
| 6,823,323 B2 | 11/2004 | Forman | |
| 6,839,680 B1 | 1/2005 | Liu et al. | |
| 6,859,807 B1 * | 2/2005 | Knight et al. | |
| 6,957,390 B2 * | 10/2005 | Tamir et al. | 715/744 |
| 6,983,282 B2 * | 1/2006 | Stern et al. | 707/805 |
| 7,035,772 B2 * | 4/2006 | Etgen | 702/187 |
| 7,194,454 B2 * | 3/2007 | Hansen et al. | |
| 7,240,039 B2 | 7/2007 | Kirshenbaum | |
| 7,406,452 B2 | 7/2008 | Forman | |
| 7,415,445 B2 | 8/2008 | Forman | |
| 7,437,334 B2 | 10/2008 | Forman | |
| 7,437,338 B1 | 10/2008 | Forman | |
| 7,502,767 B1 | 3/2009 | Forman | |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002.

(Continued)

*Primary Examiner* — Jeffrey A Burke
*Assistant Examiner* — Thong Vu
(74) *Attorney, Agent, or Firm* — International IP Law Group, PLLC (57) ABSTRACT

The present disclosure provides a computer-implemented method of processing Web activity data. The method includes obtaining a collection of Web activity data generated by a plurality of users at a plurality of Webpages, wherein the Webpages are from a plurality of unaffiliated Websites. The method also includes extracting a plurality of search terms from the Web activity data and associating each of the plurality of search terms with a corresponding Webpage. The method also includes generating statistical data from the Web activity data based, at least in part, on the search terms, the statistical data corresponding to the online activity at one or more Webpages.

18 Claims, 6 Drawing Sheets

(56) References Cited

U.S. PATENT DOCUMENTS

| | | | |
|---|---|---|---|
| 7,546,295 B2* | 6/2009 | Brave et al. | |
| 7,548,929 B2* | 6/2009 | Collins et al. | |
| 7,558,766 B1 | 7/2009 | Forman | |
| 7,577,643 B2* | 8/2009 | Dominowska et al. | |
| 7,593,903 B2 | 9/2009 | Forman | |
| 7,603,348 B2* | 10/2009 | He et al. | |
| 7,668,789 B1 | 2/2010 | Forman | |
| 7,707,201 B2* | 4/2010 | Kapur et al. | 707/706 |
| 7,720,781 B2 | 5/2010 | Forman | |
| 7,769,757 B2* | 8/2010 | Grefenstette et al. | 707/736 |
| 7,844,503 B2* | 11/2010 | Fogelson | 705/26.41 |
| 7,853,589 B2* | 12/2010 | Svore et al. | 707/728 |
| 7,877,369 B2* | 1/2011 | Waters et al. | 707/706 |
| 7,890,451 B2* | 2/2011 | Cancel et al. | 707/607 |
| 7,962,461 B2* | 6/2011 | Ruhl et al. | 707/706 |
| 7,970,784 B2* | 6/2011 | Bode | 707/760 |
| 8,069,182 B2* | 11/2011 | Pieper | 707/769 |
| 8,078,625 B1* | 12/2011 | Zhang et al. | 707/748 |
| 8,260,771 B1* | 9/2012 | Ortega et al. | 707/723 |
| 2003/0101449 A1 | 5/2003 | Bentolila et al. | |
| 2005/0130109 A1 | 6/2005 | Kirshenbaum | |
| 2005/0137939 A1* | 6/2005 | Calabria et al. | 705/26 |
| 2006/0064411 A1* | 3/2006 | Gross | G06F 17/30864 |
| 2006/0195428 A1* | 8/2006 | Peckover | 707/3 |
| 2006/0294223 A1* | 12/2006 | Glasgow et al. | 709/224 |
| 2007/0208730 A1* | 9/2007 | Agichtein et al. | 707/5 |
| 2007/0250468 A1* | 10/2007 | Pieper | 707/1 |
| 2008/0126176 A1 | 5/2008 | Iguchi | |
| 2008/0183745 A1* | 7/2008 | Cancel et al. | 707/102 |
| 2008/0222119 A1* | 9/2008 | Dai et al. | 707/4 |
| 2008/0256065 A1* | 10/2008 | Baxter | 707/5 |
| 2008/0263009 A1* | 10/2008 | Buettner et al. | 707/3 |
| 2009/0265317 A1* | 10/2009 | Buehrer et al. | 707/3 |
| 2009/0276419 A1* | 11/2009 | Jones | G06F 17/30637 |
| 2010/0114654 A1 | 5/2010 | Lukose | |
| 2010/0138451 A1* | 6/2010 | Henkin | G06Q 30/0256 707/803 |
| 2010/0241647 A1* | 9/2010 | Ntoulas | G06F 17/30528 707/765 |
| 2011/0179009 A1* | 7/2011 | Nam | 707/708 |

OTHER PUBLICATIONS

Baoyao, Zhou; "Intelligent Web Usage Mining" Nanyang Technological University, Division of Information Systems, School of Computer Engineering, 2004.
Baynote Inc.: "The Collective Intelligence Platform," Online, http://www.baynote.com/technology/platform/ 2010.
Hottolink Inc.; "Recognize" Online, http://www.hottolink.co.jp/english/reconize.html, 2009.
Hongjun Lu et al: "Extending a Web Browser with Client-Side Mining", Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India , 2008.
Shahabi et al.; "Yoda An Accurate and Scalable Web based Recommendation System?" University of Southern California, Los Angeles, Sep. 2001.
Claypool et al.; "Implicit Interest Indicators", 14. Worcester Polytechnic Institute, Worcester, Computer Science Department Worcester Polytechnic Institute Worcester, MA 01609, USA., 2001.
Shahabi et al.; "A Framework for Efficient and Anonymous Web Usage Mining Based on Client-Side Tracking", 15. University of Southern California, Los Angeles, 2002.
Chattertrap; Online http://www.chattertrap.com; Jul. 20, 2010.
HSNW: SRI defense technology spawns civilian application: published Jun. 29, 2010.
Anthony Ha: Facebook investor backs Chattertrap, a personal assistant for content, Jun. 28, 2010.
Google Trends, "About Google Trends," available at http://www.google.com/intl/en/trends/about.html (last accessed May 27, 2010).
IBM Webfountain, "Fountain of truth?", available at http://www.economist.com/science/tq/displayStory.cfm?story_id=2019861 (last accessed on May 27, 2010).
Quint, Barbara, "IBM's WebFountain Launched—The Next Big Thing?", available at http://newsbreaks.infotoday.com/nbreader.asp?ArticlesID=16617 (last accessed on May 27, 2010).
Seung, H.S., et al., "Query by Committee," COLT '92: Proceeding of the Fifth Annual Workshop on Computational Learning Theory, New York, New York, 1992, pp. 287-294.
Lewis, David D., et al., "Heterogeneous Uncertainty Sampling for Supervised Learning," Proceedings of the Eleventh International Conference on Machine Learning, Morgan Kaufmann Publishers, San Francisco, California, 1994, pp. 148-156.
Tong, Simon, et al., "Support Vector Machine Active Learning with Applications to Text Classification," Journal of Machine Learning Research, 2001, pp. 45-46.
Zhang, Cha, et al., "An Active Learning Framework for Content Based Information Retrieval," IEEE Transactions on Multimedia, Special Issue on Multimedia Database, vol. 4, Issue 2, Jun. 2002, pp. 260-268, available at http://research.microsoft.com/en-us/um/people/chazhang/publications/tr01_04_chazhang.pdf (last accessed on Jun. 3, 2010).
Melville, Prem, et al., "Diverse Ensembles for Active Learning," Proceedings of the 21st International Conference on Machine Learning, Banff, Alberta, Canada, Jul. 2004, pp. 584-591.
Yan, Rong, et al., "Automatically Labeling Video Data Using Multi-class Active Learning," Proceedings of the Ninth IEEE International Conference on Computer Vision, Washington, D.C., vol. 2, 2003, pp. 1-8.
Hakkani-Tur, Dilek, et al. "An Active Approach to Spoken Language Processing," ACM Transactions on Speech and Language Processing, vol. 3, No. 3, Oct. 2006, pp. 1-31.
Ertekin, Seyda, et al., "Active Learning for Class Imbalance Problem," Proceedings of the 30th Annual International ACM SIGIR Conference on Research and Development in Information Retrieval, Amsterdam, The Netherlands, 2007, pp. 823-824.
Collins, Brendan, et al., "Towards Scalable Dataset Construction: An Active Learning Approach," Proceedings of the 10th European Conference on Computer Vision, Part I, Marseille, France, Published in 2008 by Springer-Verlag, Berlin, Heidelberg, pp. 86-98.
Forman, George, "BNS Feature Scaling: An Improved Representation over TF-IDF for SVM Text Classification," Proceedings of the 17th ACM Conference on Information and Knowledge Management in Napa Valley, California, Published by ACM, New York, New York, 2008, pp. 263-270.
Settles, Burr, et al., "Multiple-Instance Active Learning," Advances in Neural Information Processing Systems (NIPS), MIT Press, 2008, pp. 1289-1296.
Vijayanarasimhan, Sudheendra, et al., "What's It Going to Cost You?: Predicting Effort vs. Informativeness for Multi-Label Image Annotations," IEEE Computer Society Conference on Computer Vision and Pattern Recognition (CVPR), Miami Beach, Florida, Jun. 2009, available at http://userweb.cs.utexas.edu/~svnaras/papers/vijayanarasimhan_grauman_cvpr2009.pdf. (last accessed on Jun. 3, 2010).
Forman, George, et al., "Feature Shaping for Linear SVM Classifiers," Published and presented at the 15th ACM SIGKDD Conference on Knowledge Discovery and Data Mining, Paris, France, Jun. 28-Jul. 1, 2009, pp. 299-307.

* cited by examiner

METHOD AND SYSTEM FOR PROCESSING WEB ACTIVITY DATA

BACKGROUND

Marketing on the World Wide Web (the Web) is a significant business. Users often purchase products through a company's Website. Further, advertising revenue can be generated in the form of payments to the host or owner of a Website when users click on advertisements that appear on the Website. The online activity of millions of Website users generates an enormous database of potentially useful information regarding the desires of customers and trends in Internet usage. Understanding the desires and trends of online users may allow a business to better position itself within the online marketplace.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide techniques for analyzing the Web activity of a large number of Internet users across a variety of different Websites using query uniform resource locators (URLs). As used herein, the term "exemplary" merely denotes an example that may be useful for clarification of the present invention. The examples are not intended to limit the scope, as other techniques may be used while remaining within the scope of the present claims.

In exemplary embodiments of the present invention, a collection of raw electronic data may be obtained for a plurality of online entities and users. The raw data may include a plurality of query URLs generated by visitors to various Websites. Search terms chosen or entered by the user may be extracted from the query URL and analyzed to provide various statistical data regarding Internet activity across a range of users and Websites. In exemplary embodiments of the present invention, the analysis of the query URLs may be used to identify competitors, or determine what searches are being performed at competitor sites, monitor trends in user search activity, and the like. Such information may enable an online entity to better position itself within the online marketplace. For example, knowledge of the search terms used at a particular Website may enable owners of other Websites to personalize their Websites to appeal to a broader range of users. Additionally, the keyword bidding strategy used by an owner of a Website may be improved by knowing which keywords are used more often in relation to certain Websites.

Figure 1:
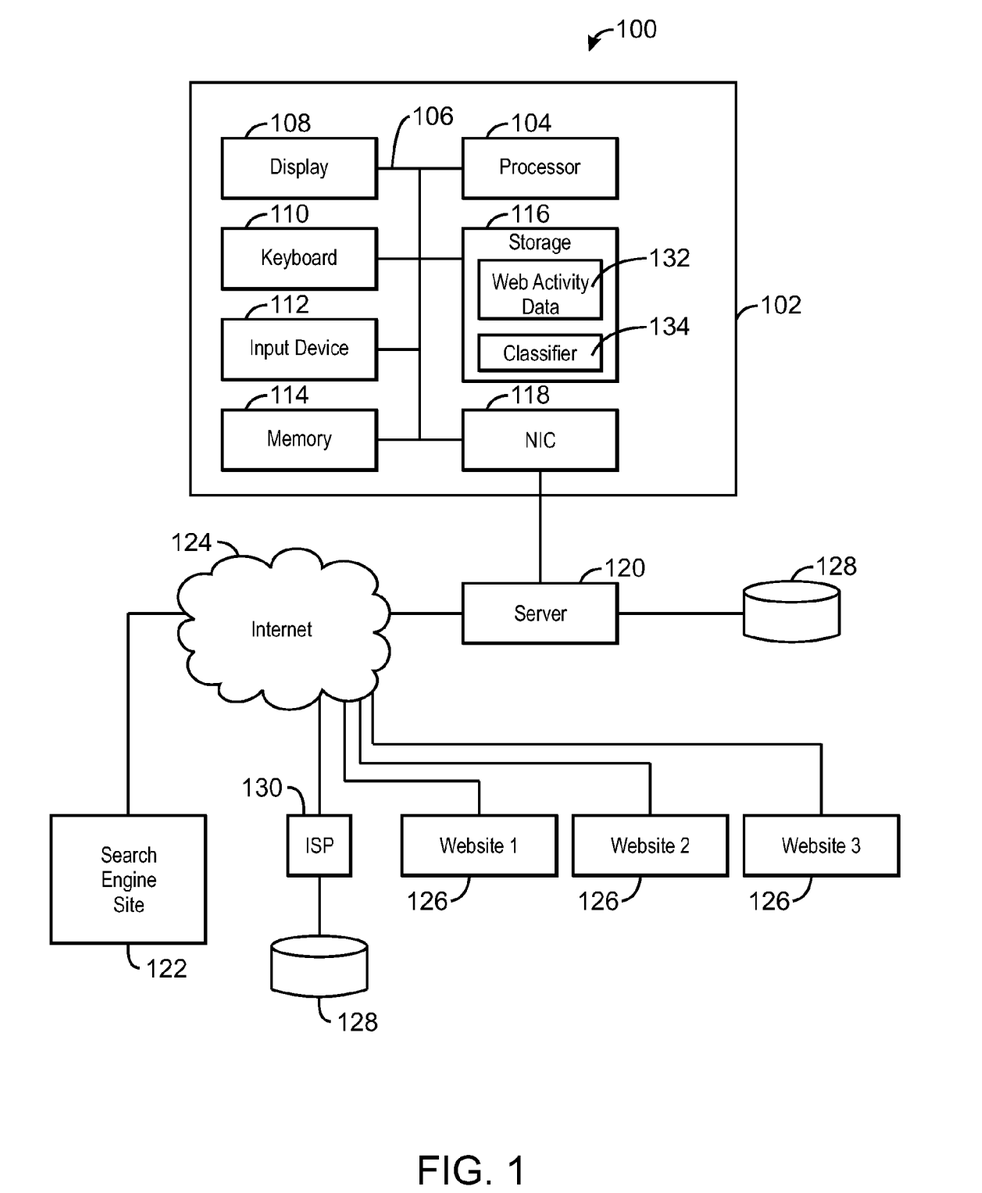
FIG. 1 is a block diagram of a computer network in which a client system can access a search engine and Websites over the Internet, in accordance with exemplary embodiments of the present invention.

FIG. 1 is a block diagram of a system that may be used to generate cases for use in developing a classifier, in accordance with exemplary embodiments of the present invention. The system is generally referred to by the reference number 100. Those of ordinary skill in the art will appreciate that the functional blocks and devices shown in FIG. 1 may comprise hardware elements including circuitry, software elements including computer code stored on a tangible, machine-readable medium, or a combination of both hardware and software elements. Additionally, the functional blocks and devices of the system 100 are only one example of functional blocks and devices that may be implemented in an exemplary embodiment of the present invention. Those of ordinary skill in the art would readily be able to define specific functional blocks based on design considerations for a particular electronic device.

As illustrated in FIG. 1, the system 100 may include a computing device 102, which will generally include a processor 104 connected through a bus 106 to a display 108, a keyboard 110, and one or more input devices 112, such as a mouse, touch screen, or keyboard. In exemplary embodiments, the device 102 is a general-purpose computing device, for example, a desktop computer, laptop computer, business server, and the like. The device 102 can also have one or more types of tangible, machine-readable media, such as a memory 114 that may be used during the execution of various operating programs, including operating programs used in exemplary embodiments of the present invention. The memory 114 may include read-only memory (ROM), random access memory (RAM), and the like. The device 102 can also include other tangible, machine-readable storage media, such as a storage system 116 for the long-term storage of operating programs and data, including the operating programs and data used in exemplary embodiments of the present invention.

In an exemplary embodiment, the device 102 includes a network interface controller (NIC) 118, for connecting the device 102 to a server 120. The computing device 102 may be communicatively coupled to the server 120 through a local area network (LAN), a wide-area network (WAN), or another network configuration. The server 120 may have a machine-readable media, such as storage array, for storing enterprise data, buffering communications, and storing operating programs of the server 120. Through the server 120, the computing device 102 can access a search engine site 122 connected to the Internet 124. In exemplary embodiments of the present invention, the search engine 122 includes generic search engines, such as GOOGLE™, YAHOO®, BING™, and the like. The computing device 102 can also access Websites 126 through the Internet 124. Each of the Websites 126 can include a single Webpage or multiple Webpages arranged in a hierarchical tree. Although the Websites 126 are actually virtual constructs that are hosted by Web servers, they are described herein as individual (physical) entities, as multiple Websites 126 may be hosted by a single Web server and each Website 126 may collect or provide information about particular users. Further, each Website 126 will generally have a separate identification, such as a uniform resource locator (URL), and will function as an individual entity.

The Websites 126 may also provide search functions, for example, searching subpages to locate products or publications provided by the Website 126. For example, the Websites 126 may include sites such as EBAY®, AMAZON. COM®, WIKIPEDIA™, CRAIGSLIST™, CNN.COM™, and the like. Further, the search engine site 106 and one or more of the Websites 126 may be configured to monitor the online activity of a visitor to the Website 126, for example, regarding searches performed by the visitor. As used herein, the term "online activity" refers to any activity that may be performed over a network, for example, accessing Webpages on the Internet, performing searches, providing data to a Website, and the like.

The computing device 102 and server 120 may also be able to access a database 128, which may be connected to the server 120 through the local network or to an Internet service provider (ISP) 130 on the Internet 124, for example. The database 128 may be used to store a collection of Web activity data to be processed in accordance with exemplary embodiments of the present inventions. As used herein, a "database" is an integrated collection of logically related data that consolidates information previously stored in separate locations into a common pool of records that provide data for an application.

The computing device 102 may also include a collection of Web activity data 132, which may be processed in accordance with the techniques described herein to generate statistical data that may be useful to identify various market characteristics and trends. In exemplary embodiments of the present invention, the Web activity data 132 is stored, for example, in the storage system 116, and may include Web activity data for a plurality of Internet browsers generated at a plurality of Websites. For example, the raw electronic data 132 may include records of the Web pages clicked on by individual browsers, the Hyper Text Markup Language (HTML) or eXtensible Markup Language (XML) content of Web pages, the results of Web searches that have been performed at various Websites, and the like. The Web activity data 132 may also include URL data, for example, a collection of query URLs that represent searches performed by a Web browser. The Web activity data may be provided to the computing device 102 via a storage medium, for example, the database 128, a portable storage medium such as a compact disk (CD), and the like.

The computing device 102 may also include a classifier 134 that may be used to automatically identify a target class of information within the Web activity data 132. As used herein, the term "automatically" is used to denote an automated process performed by a machine, for example, the computing device 102. It will be appreciated that various processing steps may be performed automatically even if not specifically referred to herein as such. In the exemplary embodiments wherein the Web activity data 132 includes query URLs, the classifier 134 may be used to identify data fields of the query URLs that represent search terms entered by a user. The classifier may be generated by a training system that receives input from a trainer, for example, a person that visually inspects a portion of the Web activity data and labels certain data fields within the Web activity data as belonging to the target class. The labels provided by the trainer may be used to generate the classifier. For example, the classifier 114 may be generated using a supervised machine-learning algorithm, for example, a Naïve Bayes algorithm, support vector machine, or the like. As used herein the term "classifier" may be used to refer to any computer implemented method for identifying data fields within the Web activity data that include the target class of information. For example, the classifier may include a pattern matching system, decision making system, regressed functions system, evolved programs, or machine learning systems, among others.

Exemplary techniques for generating a classifier are discussed further in the commonly assigned and co-pending patent applications listed below. Exemplary techniques for generating a classifier are discussed in U.S. patent application Ser. No. 12/618,159, filed on Nov. 13, 2009, entitled "Method and System for Developing a Classification Tool," by Evan R. Kirshenbaum, et al., which is hereby incorporated by reference as though fully set forth in their entirety herein. Exemplary techniques for grouping URLs into cases are described in U.S. patent application Ser. No. 12/618,170, filed on Nov. 13, 2009, entitled "Method and System for Segmenting Query URLs," by Shyam Sundar Rajaram, et al., which is hereby incorporated by reference as though fully set forth in their entirety herein. Exemplary techniques for generating a case-centric classification tool are described in U.S. patent application Ser. No. 12/618,181, filed on Nov. 13, 2009, entitled "Method and System for Developing a Classification Tool," by Evan R. Kirshenbaum, et al., which is hereby incorporated by reference as though fully set forth in their entirety herein.

In some exemplary embodiments, the classifier 134 may be designed to identify Website forms in which users typically enter a target class of information, for example, mailing addresses, email addresses, telephone numbers, or other types of contact information. In some embodiments, the target class of information may be a search term entered by the user. As used herein, a search term may be any term entered or selected by a user that indicates an interest of the user. Furthermore, the target class of information may be information that was selected from a list of options provided by a Web form, for example, selected by clicking on a link or selected from a drop-down menu or other list. Such a classifier 134 may be used to identify popular Websites whose users have been willing to provide such contact information. For example, this may enable a vendor such as a catalog mailer to identify which Websites may be most worthwhile to advertise at or partner with in order to find customers willing to share their contact information to receive catalogs.

In some exemplary embodiments, the classifier 134 is generated by the computing device 102. In such embodiments, a portion of the Web activity data 132 may be used to train the classifier 134. The classifier 134 may be stored to a tangible machine-readable medium, for example, storage system 116. In other embodiments, the classifier 134 may be generated on a separate machine and provided to the computing device 102, for example, via the database 128, a portable storage medium such as a compact disk (CD), and the like. The computing device may also include two or more classifiers for identifying two or more different target classes of information.

The computing device 102 may be used to process the Web activity data 132 to generate statistical data, as described below in reference to FIGS. 2-4. For example, the Web activity data 132 may be processed to identify the search terms that have been employed by a plurality of users at a plurality of Websites. The identified search terms may be normalized or converted to a standard character set. For example, the search terms may be lowercased, accents and non-alphanumeric characters may be removed, and the like. Furthermore, some search terms may include strings of two or more words, in which case the search terms may be processed to extract individual words, bigrams, and the like. Identifying the search terms from the Web activity data may enable the generation of various statistics regarding the interests of many users across a large number of Web pages. The statistical data may be compiled into a report, which may enable a Website administrator to better tailor the Website based on visitor interests and market trends. For example, as discussed in more detail below, the report may be used to identify competing Websites, search terms used at competing Websites, the more commonly visited Websites for a particular category of search terms, and the like.

Figure 2:
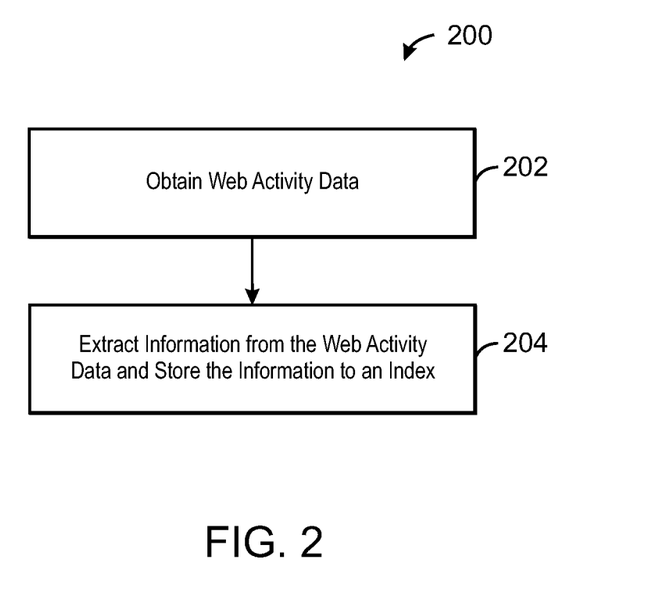
FIG. 2 is a process flow diagram of a method of processing Web activity data, in accordance with exemplary embodiments of the present invention.

FIG. 2 is a process flow diagram of a method of processing Web activity data, in accordance with exemplary embodiments of the present invention. For the purpose of clarity, the exemplary embodiments set forth below describe techniques for extracting user-entered search terms from query URLs. However, it will be appreciated that the techniques described herein may also apply to extracting other types of target information from other types of Web activity data.

The method is generally referred to by the reference number 200 and may begin at block 202, wherein a set of Web activity data may be obtained. The Web activity data may include any suitable electronic data and the target class of information may be any type of useful information that may be included in the Web activity data. In some exemplary embodiments, the Web activity data includes a plurality of query URLs corresponding to searches performed by plurality of Internet users at a plurality of Webpages from unaffiliated Websites. As used herein, the term "unaffiliated Websites" refers to Websites that are operated by different ownership entities, for example, GOOGLE™, YAHOO™, and CRAIGLIST™. Due to the fact that the Websites are unaffiliated, the naming conventions used by the Webpages to identify various types of data fields within the Web activity data may vary, and a tool for translating between the various conventions may not be available. The Web activity data may also include a variety of additional information that corresponds with each of the query URLs. For example, one or more of the query URLs may be associated with a user, such as an IP address of a system used to perform the search. Additionally, the Web activity data may also include date and time information associated with the query URLs and identifying a date and time that the corresponding search was performed. One or more of the query URLs may also be associated with a record of the Web pages clicked on by the user after viewing the results of the search corresponding to the query URL. In some embodiments, the Web activity data of a user may include information associated with each URL, such as a timestamp or sequentiallity measure, that identifies an order by which the user accessed various Web pages. In this way, Web pages may be identified that have a high probability of being linked to from a given Web page.

In exemplary embodiments of the present invention, the Web activity data may be obtained by directly monitoring Web activity generated at a plurality of Websites by plurality of users. For example, with reference to FIG. 1, the server 104 may monitor the online activity of several client computing devices 102. In other exemplary embodiments, the Web activity data is obtained from a third party, such as one or more Websites 126, an internet service provider 130, the search engine site 122, an internet monitoring service, and the like. Furthermore, in some embodiments the Web activity data may be obtained from the website logs of multiple organizations' Websites. In some embodiments, Web activity data may be obtained by gathering click-stream logs from multiple users via monitoring software installed on their client computers (either in the OS or in the browser or a separate opt-in service). In some embodiments, Web activity data may be obtained by collecting the click-stream logs observed by one or more ISPs or Internet backbone providers that monitor Web traffic from many users to many Websites.

At block 204, information may be extracted from the Web activity data and stored to an index. The extracted information may include search terms entered by a user into a search form. In this case, the Web activity data may be searched to identify query URLs generated by such search forms. Upon identifying a query URL, the classifier may be used to identify the search terms. A query URL will generally be of the form:

http://www.website.com/a/b/c?k1=v1&k2=v21+v22&k3=v3

In the above query URL, the hostname is the portion of the URL that precedes the first single forward slash, in this case "http://www.website.com", the path is everything from the first single forward slash (when one exists) that precedes the question mark, in this case "/a/b/c", and the query portion of the query URL is everything that follows the question mark. As used herein, the term "Website name" is used to refer to any combination of components from the hostname and components from the path. Furthermore, the query portion of the query URL may include one or more data fields, which may be separated by ampersands. Each data field may include a data field name, for example, "k1," and a data field value, for example, "v1." In the example query URL provided above, the query URL includes three data fields, namely "k1," which has the value "v1," "k2," which has the value "v21+v22," and "k3," which has the value "v3."

It will be appreciated that the naming convention used herein is hypothetical and that any suitable character string may be used to represent the various data field names and values used in an actual query URL. The naming convention used in the query URL may be an ad hoc convention designated for a single Web form or Website. Therefore, a common naming convention used across the multiple Websites is typically not available. For example, a hypothetical search field named "q" may refer to different types of data. In one query URL, "q" may refer to data field that holds a search term entered by a user. However, in another query URL, "q" may refer to something different, for example a data field that holds a desired quantity of a product. The classifier may be used to identify the data fields in the query URL that correspond with a search field despite the fact that the search field may not be represented in a consistent manner across multiple query URLs. Upon identifying the search fields in the query URL, the corresponding search terms may be extracted and stored to the index.

Additional information associated with the query URL may also be stored to the index, for example, the hostname, the path, and the like. Additionally, a time stamp corresponding to the data or time that the corresponding search was performed may be stored in the index. The index may be used to generate various statistical data regarding search behavior and trends in Internet usage.

The generation of the index provides an effective technique for analyzing the Web activity data to generate the statistical data. In other exemplary embodiments, the generation of the index may be skipped and the Web activity data may be searched directly. Methods of generating various statistical data regarding search behavior and trends in Internet usage are described further below in relation to FIGS. 3 and 4.

Figure 3:
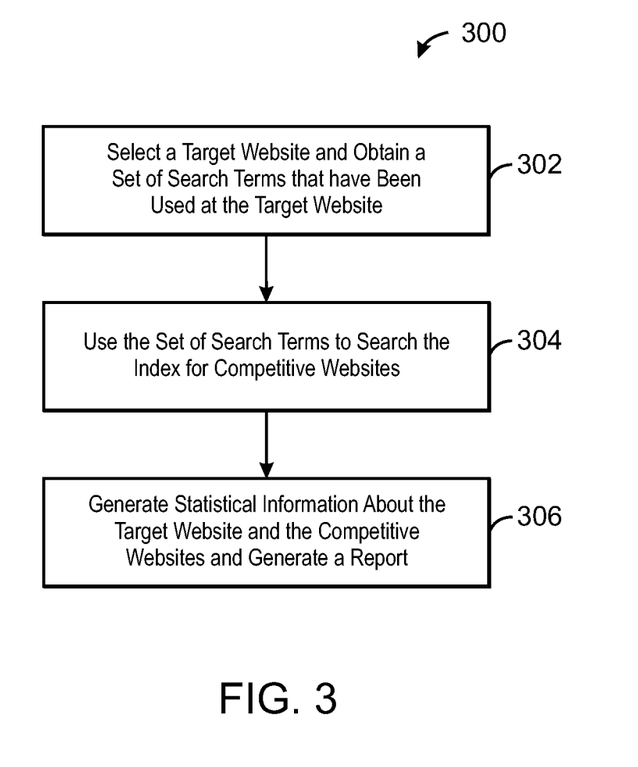
FIG. 3 is a process flow diagram of a method of generating statistical data from Web activity data, in accordance with exemplary embodiments of the present invention.

FIG. 3 is a process flow diagram of a method of generating statistical data from Web activity data, in accordance with exemplary embodiments of the present invention. The method is generally referred to by the reference number 300 and may begin at block 302, wherein a target Website may be selected and a set of search terms that have occurred at the target Website may be obtained. The search terms that have occurred at the target Website may be referred to herein at the "target search terms." The target Website (or set of Websites) may be any Website(s) that provide a basis by which to search the index and generate the statistical data. For example, the target Website(s) may be a Website or set of Websites belonging to a customer who is requesting a market report. The statistical data generated from the index may be relevant to the target Website(s). For example, the statistical data may inform the customer of the target search terms (e.g., the most common or most distinctive search terms) used across their Websites. With the use of the timestamp associated with each indexed search, the system may also identify rising or falling trends in search keyword usage over time for the target Websites.

In some exemplary embodiments, the target search terms are obtained by searching the index. In other embodiments, the target search terms may be obtained by searching the logs of the target Website's web server. Furthermore, a frequency counter may be generated for each of the target search terms. The frequency counter may tally the number of times that the corresponding target search term was used at the target Website. Thus, the frequency counter may be used to characterize the relative strength of a particular search term's connection to the target Website compared to the other target search terms. In some embodiments, after obtaining the set of target search terms that have occurred at the target Website, the process flow may advance to block 304.

At block 304, the index may be searched to identify other Websites that are similar based on the usage of the target search terms obtained in block 302. These similar Websites may be competitive or complementary Websites that provide a similar service or product information as the target Website. As noted above, the Web activity data may be searched directly and the generation of the index as described in block 204 of FIG. 2 may be skipped. During the search, a set of counters corresponding to each of the target search terms may maintained for each Website. Each counter tracks the number of times that the corresponding target search term occurs for the corresponding Website. In some exemplary embodiments, the counters may be separated into periodic time bins, which may enable the generation of statistical data that relates to search trends over time. Counting the number of times that each target search term occurs at the other Websites enables a correlation to be identified between the target Website and other Websites included in the Web activity data. For example, if the final tallies for a particular Website are large, this may indicate that users are performing similar searches at both Websites. Thus the Website may be a competitive Website in relation to the target Website. As used herein, the term "competitive Website" is used herein to refer to a Website in the Web activity data that tends to appear with search terms that often occur at the target Website. Such a site may also be complementary, e.g., providing product reviews for similar products.

In some exemplary embodiments, the final tally for each of the counters may be weighted based, at least in part, on the frequency counters for each of the corresponding target search terms. In this way, information that is more relevant to the target Website may be more readily identified. For example, if the target search term "duct tape" occurs at the target Website 10,000 times and the target search term "angle irons" occurs 20 times, the strength of connection between the target Website and the term "angle irons" will be relatively weak compared to the term "duct tape." Thus, it may be useful to reduce the correlation between the target Website and other Websites that also occur with the term "angle irons" or increase the correlation between the target Website and other Websites that use the term "duct tape." The frequency counter for each target search term may be used to generate a weighting factor corresponding to each of the target search terms. The weighting factor may be applied to each of the corresponding tallies to increase or reduce the correlation between the target Website and the other Websites that also occur with the corresponding target search term. After generating the tallies, the process flow may advance to block 306.

At block 306, the index may be used to generate statistical data about the target Website and the competitive Websites. The statistical data may be added to a report. As used herein, the term "report" is used to describe a set of statistical data generated in accordance with present techniques and stored in an electronic format. The report may be used to generate a visual representation of the resulting statistical data and may be used by the administrator of the target Website to improve the content or visual appearance of the target Website. The report may include a variety of useful Internet usage metrics that are generated based, at least in part, on the tallies generated at block 304. For example, the report may include a listing of the other Websites with the highest tallies, weighted or unweighted. In this way, the report may be used to identify the target Website's competitors based on common search terms being used at the target Website and the other Websites. In some exemplary embodiments, the tallies in the report are separated into time bins, thus enabling the report to represent the relative change in search activity over time. In this way, the report may be used to identify whether search activity at the other Websites is increasing or decreasing over time in relation to each other and the target Websites. In some embodiments, the statistical data may be used to generate a predictive model, and the report may also include predictions made by the predictive model. In this way, the report may be used to identify search activity that is expected to increase or decrease in the future. Furthermore, the report may also include a listing of search terms used at individual Web pages within each Website. In this way, the report may be used to identify the specific Web pages within the target Website and the other Websites that are more often used for particular types of searches.

In one exemplary embodiment, the target Website's competitors may be automatically identified by generating a relevance score for each of the other Websites based on the tallies. The relevance score may be generated by multiplying each tally by the weighting factor and summing each of the weighted tallies that correspond with a particular Website into an aggregate weighted average for the Website. In some embodiments, the total weighted tally is divided by a number reflective of the overall popularity of the target Website (e.g., the number of searches in common divided by the total number of searches recorded at the target Website), the competitor Website (e.g., the number of searches in common divided by the number of searches at the competitor Website), or both (e.g., the Jaccard measure, which divides the size of the intersection of searches by the size of their union).

The Websites may then be ranked in order of decreasing relevance score. The top N Websites may be identified as competitive Websites. The identification of the competitive Websites may be included in the report. Furthermore, additional statistical data may be generated for each of the competitive Websites. In one exemplary embodiment, the index may be searched to identify the search terms that often occur at each of the competitive Websites. The top search terms that occur at the competitive Websites may be included in the report along with a total count of the number of times that the search terms occurs at both the competitive Website and the target Website. In this way, the report may be used to identify search terms that occur at competitive Websites but do not regularly occur at the target Website. This may enable the administrator of the target Website to identify areas of user interest that could be better represented or highlighted at target Website.

In some exemplary embodiments, a report may be generated periodically using newly acquired Web activity data to identify trends in usage at the target Website or the competitive Websites. The periodic report generation may be used to quickly identify new search trends and evaluate the effectiveness of changes that may have been made to the target Website in response to a previous report, for example. It will be appreciated that the statistical data described above represents only a few examples of the types of useful information that may be obtained by processing Web activity data in accordance with embodiments of the present invention.

Figure 4:
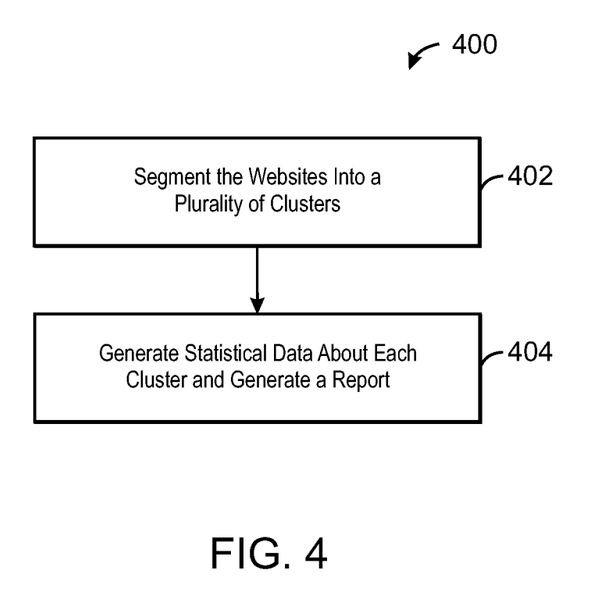
FIG. 4 is a process flow diagram of a method of generating statistical data from Web activity data, in accordance with exemplary embodiments of the present invention.

FIG. 4 is a process flow diagram of a method of generating statistical data from Web activity data, in accordance with exemplary embodiments of the present invention. The method is generally referred to by the reference number 400 and may begin at block 402, wherein the plurality of Websites represented in the Web activity data may be segmented into a plurality of clusters. Segmenting the Websites may include grouping the Websites according to the similarity of the search terms used at the Websites. To segment the Websites, the index generated at block 204 of FIG. 2 may be searched to identify the Websites included in the data and the search terms that occur at each Website. In other embodiments, the Web activity data may be searched directly and the generation of the index may be skipped. For each Website or Webpage, a list of Website/query pairs may be generated. Each Website/query pair may include a name of the Website or Webpage and one of the search terms used at the corresponding Website or Webpage. In some exemplary embodiments, the Website names and the search terms may be normalized, for example, setting all letters to lowercase, removing punctuation, canonicalizing accented characters, removing stopwords, and the like. The Website/query pairs may then be sorted and a graph may be generated from the Website/query pairs.

The graph may be a sparse, undirected Website-Website graph that includes a plurality of nodes representing individual Websites and edges between the pairs of Websites with at least some searches in common. Each node may describe the number of times that search terms occur at the Website. Each edge may describe the number of times that a common search term occurs at the corresponding Websites connected by the edge. The graph may be generated by reading the sorted list of Website/query pairs incrementally. For each distinct query, the list of Websites at which the query occurs may be identified. The node may then be incremented for each identified Website corresponding to the query, and the edges between each of the identified Websites may also be incremented.

The graph may be processed to automatically identify pairs of strongly correlated Websites. To identify pairs of strongly correlated Websites, the graph may be processed to identify edges with counts that are a large fraction of the node count at one or the other node, or both. For example, a Jaccard index may be computed for each edge according to the following formula:

$$Jaccard = \frac{Edge}{Node1 + Node2 - Edge}$$

In the above formula, "Edge" is the edge count, "Node1" is the node count at the first node, and "Node2" is the node count at the second node. To identify groups of strongly correlated Websites, the Website segmentation may be generated by grouping together the Websites with the strongest correlations according to the graph. Each group of Websites may be referred to as a cluster. It will be appreciated that the same process of grouping Websites into clusters may also be applied to grouping Webpages into clusters. In this case, Webpages belonging to the same Website may be grouped into different clusters, depending on the searches that are detected at each Webpage. After grouping the Websites into clusters, the process flow of method 400 may advance to block 404.

At block 404, the clusters may be used to generate statistical data about the Web activity data and the statistical data may be used to generate a report. In an exemplary embodiment, the statistical data includes a ranking of the most popular Websites in each cluster. The popularity of each Website may be determined, at least in part, by the number of searches performed at the Website, the number of unique users that have performed searches at the Website, and the like. Furthermore, the statistical data may also include a ranking of the most popular Web pages in each cluster. Thus, although a particular Website may be identified as being more popular overall, certain Webpages within the particular Website may not be as popular as other more content-specific Websites in various other clusters. For example, the statistical data may reveal that the Website "Amazon.com" may have a high popularity rank overall, but the Webpage "Amazon.com/autos" may be less popular than "cars.com," for example.

The ranking information may enable a person to make more informed decisions in a variety of contexts. For example, identifying Website clusters my enable a Website administrator to place advertisements on those Websites that lead to other Websites in the same cluster as the administrator's Website. Further, the rankings may allow an administrator of a particular Website to identify competitive Websites and evaluate the popularity of the administrator's Website in relation to competitors. Further, the Administrator may be able to identify particular subject matter in which the Website is underperforming compared to competitive Websites based on a reduced popularity rank in a particular cluster. Thus, the Administrator may be able to identify particular areas of the Website that may need improvements or would benefit from additional advertisement. Additionally, the ranking information may enable a vendor in a particular cluster to identify Websites or Webpages that would likely be effective for placing advertisements. In this case, the identified Websites may be competitive Websites, reviewing Websites, hobbyist Websites, blogs, and the like.

In another exemplary embodiment, the statistical data may include a list of the more common search terms that occur within each cluster. The list of search terms may be ranked according to prevalence. The search term rankings may reveal the types of searches being performed in a particular cluster and how users are phrasing those searches. Thus, the search term rankings may enable a Website administrator to more effectively design a Webpage that attracts users with interests corresponding to one or more specific search terms. In another embodiment, the search term rankings may be used by a Website administrator to identify search terms that are commonly used at Websites in the same cluster as the administrator's Website. The administrator may the use this information to inform their keyword bidding for the identified search term from an ISP, search engine site, and the like, wherein the administrator's Website may be visually highlighted in response to a search that uses the purchased search term. In another embodiment, a search term may be identified as being newly prevalent. A newly prevalent search term may be one that tends to appear with greater frequency in the later Web activity data, as indicated by the periodic time bins.

Figure 5:
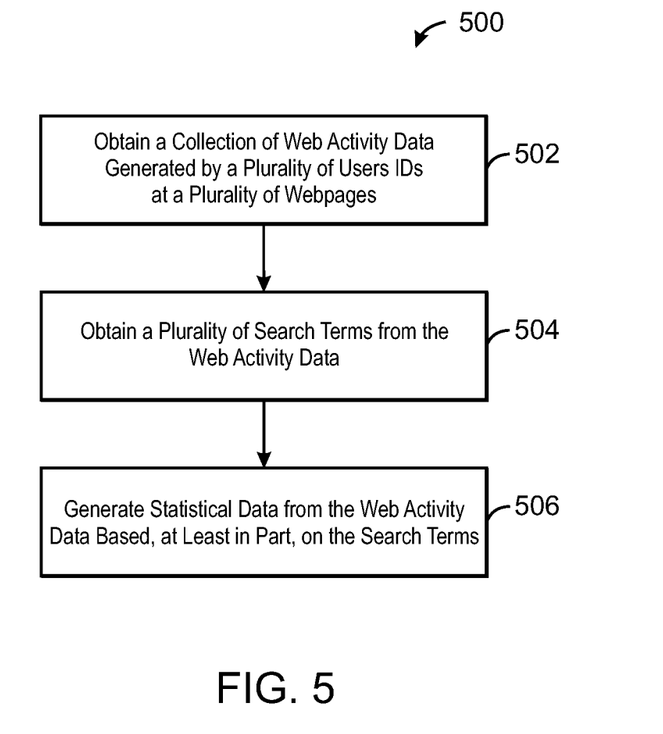
FIG. 5 is a process flow diagram of an overview of a method of processing Web activity data, in accordance with exemplary embodiments of the present invention.

FIG. 5 is a process flow diagram of an overview of a method of processing Web activity data, in accordance with exemplary embodiments of the present invention. The method is generally referred to by the reference number 500 and may begin at block 502, wherein a collection of Web activity data generated by a plurality of users at a plurality of Webpages may be obtained. At block 504, plurality of search terms may be extracted from the Web activity data. At block 506, statistical data may be generated from the Web activity data based, at least in part, on the search terms. The statistical data may correspond to the online activity at the one or more Webpages.

Figure 6:
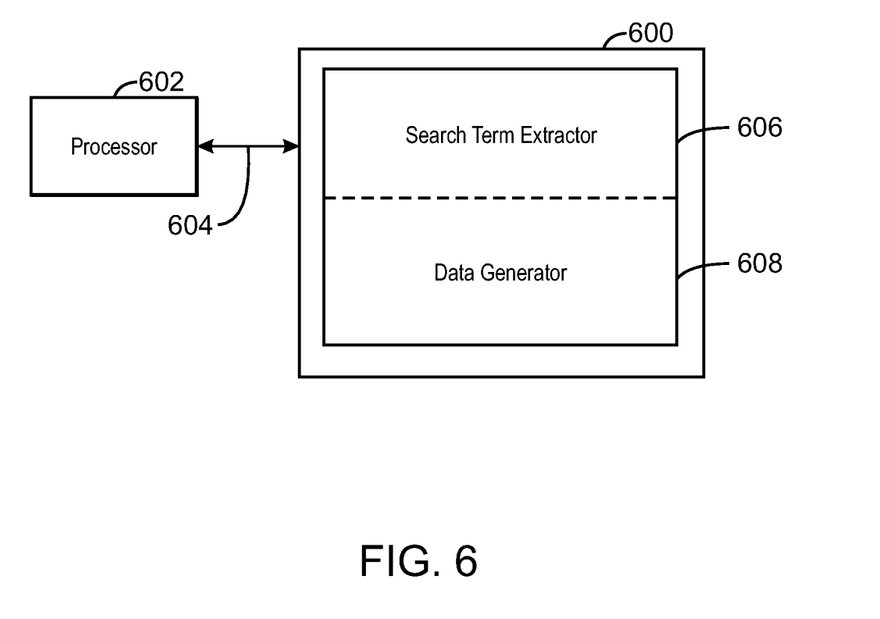
FIG. 6 is a block diagram showing a tangible, machine-readable medium that stores code configured to statistical data from Web activity data, in accordance with exemplary embodiments of the present invention.

FIG. 6 is a block diagram showing a tangible, machine-readable medium that stores code configured to generate a classifier, in accordance with an exemplary embodiment of the present invention. The tangible, machine-readable medium is referred to by the reference number 600. The tangible, machine-readable medium 600 can comprise RAM, a hard disk drive, an array of hard disk drives, an optical drive, an array of optical drives, a non-volatile memory, a universal serial bus (USB) drive, a digital versatile disk (DVD), a compact disk (CD), and the like.

In some exemplary embodiments, the tangible, machine-readable medium 600 may store a collection of data comprising Web activity data generated by a plurality of users at a plurality of Webpages. In some exemplary embodiments, the Web activity data comprises a plurality of query URLs. In one exemplary embodiment of the present invention, the tangible, machine-readable medium 600 will be accessed by a processor 602 over a communication path 604.

As shown in FIG. 6, the various exemplary components discussed herein can be stored on the tangible, machine-readable medium 600. For example, a first region 606 on the tangible, machine-readable medium 600 may store a search term extractor configured to obtain a plurality of search terms from the Web activity data. A region 608 can include a data generator configured to generate statistical data from the Web activity data based, at least in part, on the search terms, the statistical data corresponding to the online activity at one or more Webpages.

What is claimed is:

1. A computer-implemented method of processing Web activity data, comprising:
obtaining a collection of Web activity data generated by a plurality of users at a plurality of Webpages associated with a plurality of unaffiliated Websites, wherein the Web activity data comprises a plurality of query Uniform Resource Locators (URLs) that represent searches performed by users;
extracting a plurality of search terms from the plurality of query URLs and associating each of the plurality of search terms with a corresponding Webpage, wherein extracting the plurality of search terms comprises extracting a target class of information from a URL query field that has been identified by a classifier generated by a training system; and
generating statistical data from the Web activity data based, at least in part, on the search terms, wherein the statistical data comprises a first statistical data for a target search term associated with a target Webpage and a second statistical data for the target search term associated with another Webpage.

2. The computer-implemented method of claim 1, wherein generating the statistical data comprises using the target search term to identify at least one Webpage at which the target search term occurs.

3. The computer implemented method of claim 1, wherein generating the statistical data comprises maintaining a set of counters, each counter corresponding to the target search term and one of the Webpages in the Web activity data, and each counter tracks the number of times that the corresponding target search term occurs at the corresponding Webpage.

4. The computer implemented method of claim 3, wherein generating the statistical data comprises generating a weighting factor for the target search term based, at least in part, on the number of times that the target search term occurs at the target Webpage and applying the weighting factor to each of the counters corresponding to the target search term.

5. The computer-implemented method of claim 1, wherein generating the statistical data comprises segmenting the plurality of Webpages into a plurality of clusters based, at least in part, on a similarity of the search terms applied to the Webpages.

6. The computer-implemented method of claim 5, wherein segmenting the plurality of Webpages comprises generating a graph comprising a node corresponding to a Webpage and an edge corresponding to a pair of Webpages at which a common search term occurs.

7. The computer-implemented method of claim 6, wherein segmenting the plurality of Webpages comprises generating a Jaccard index for the edge.

8. A computer system, comprising:
a processor that is configured to execute machine-readable instructions; and
a memory device that stores Web activity data generated by a plurality of users at a plurality of Webpages associated with a plurality of unaffiliated Websites, wherein the Web activity data comprises a plurality of query Uniform Resource Locators (URLs) that represent searches performed by users; and
instructions that are executable by the processor, the instructions comprising:
a search term extractor configured to obtain a plurality of search terms from the plurality of query URLs and associate each of the search terms with a corresponding Webpage, wherein the search term extractor is a classifier, which is generated by a training system and configured to identify a portion of the query URLs that include the search terms; and
a data generator to generate statistical data from the Web activity data based, at least in part, on the search terms, wherein the statistical data comprises a first statistical data for a target search term associated with a target Website and a second statistical data for the target search term associated with another Website.

9. The computer-implemented method of claim 5, wherein generating the statistical data comprises ranking the Webpages in each cluster according to the number of searches performed at each of the Webpages.

10. The computer-implemented method of claim 8, wherein the data generator is to:
search the Web activity data to identify Websites at which the target search term occurs.

11. The computer-implemented method of claim 10, wherein the data generator is to:
count the number of times that the target search term occurs at each of the Websites; and
rank the Websites based, at least in part, on the count.

12. The computer-implemented method of claim 10, wherein the data generator is configured to identify a competitive Website based, at least in part, on a similar search term occurring at the target Website and the competitive Website.

13. The computer-implemented method of claim 8, wherein the data generator is configured to group the Webpages into clusters based, at least in part, on a similarity of the search terms that occur at to the Webpages.

14. The computer-implemented method of claim 8, wherein the data generator is configured to rank the Webpages in each cluster according to the number of searches performed at each of the Webpages.

15. A tangible, non-transitory, computer-readable medium, comprising code configured to direct a processor to:
obtain a collection of Web activity data, wherein the Web activity data comprises a plurality of query Uniform Resource Locators (URLs) that represent searches performed by users;
obtain a plurality of search terms from the plurality of query Uniform Resource Locators (URLs), wherein the search terms are obtained by a classifier, which is generated by a training system and configured to identify a portion of the query URLs that include the search terms; and
generate statistical data from the Web activity data based, at least in part, on the search terms, wherein the statistical data corresponds to the online activity at a plurality of Webpages associated with a plurality of unaffiliated Websites and comprises a first statistical data for a target search term associated with a target Website and a second statistical data for the target search term associated with another Website.

16. The tangible, non-transitory, computer-readable medium of claim 15, comprising code to:
search the Web activity data to identify a competitive Website based, at least in part, on the number of times that the target search term occurs at the competitive Website.

17. The tangible, non-transitory, computer-readable medium of claim 15, comprising code to:
segment the plurality of Webpages into a plurality of clusters based, at least in part, on a similarity of the search terms applied to the Webpages; and
rank the Webpages in each cluster according to the number of searches performed at each of the Webpages.

18. The computer-implemented method of claim 1, wherein the target Webpage is associated with a target Website and the another Webpage is associated with another Website unaffiliated with the target Website.

* * * * *